Jan. 24, 1967  A. W. COOK  3,299,988

DRAG BLOCK BRAKE

Filed Jan. 6, 1965

INVENTOR.
ALBERT W. COOK
BY
J. B. Holden
ATTORNEY

United States Patent Office 3,299,988
Patented Jan. 24, 1967

3,299,988
DRAG BLOCK BRAKE
Albert W. Cook, Tallmadge, Ohio, assignor to The Goodyear Tire & Rubber Company, Akron, Ohio, a corporation of Ohio
Filed Jan. 6, 1965, Ser. No. 423,797
4 Claims. (Cl. 188—29)

This invention relates to brakes for pneumatic tires carried on rotating wheels, especially for airplanes, and, more particularly, is concerned with brakes wherein a drag block is applied directly against the pneumatic tire, usually the tread thereof.

It has been known heretofore to apply wooden blocks against the steel rim of a wagon wheel, but in braking a wheel carrying a pneumatic tire it is invariably the practice to apply the brake against some portion of the wheel or the rim of the wheel carrying the pneumatic tire. The result is that the brake is applied on a shorter radius of torque arm, requiring greater power, and with the brake structure itself, of necessity, being heavier, more complicated and expensive.

It is the general object of the invention to avoid and overcome the foregoing and other difficulties of and objections to the prior art by the provision of an improved brake for a pneumatic tired wheel, the brake being characterized by the discovery that the brake can be applied directly in the form of a contoured block to the pneumatic tire preferably in the tread area thereof.

Another object of the invention is the provision of a particularly simple and lightweight brake for airplanes and the like, and wherein the brake is applied at the maximum torque radius of the rotating pneumatic tire which is to be braked, and with the brake being particularly beneficial when used with tires having relatively small bead diameters.

Another object of the invention is the provision of an airplane brake having a minimum of weight, excellent effectiveness, and low cost.

Another object of the invention is to provide a brake of the type described but incorporating a self-energizing action.

The foregoing objects of the invention, and other objects which will become apparent as the description proceeds, are achieved by providing in combination, a fixed axle, a pneumatic tire having a relatively small bead diameter, hub means rotatably mounting the tire on the axle, a torque arm fixed to the axle and extending substantially radially of the side of the tire, a brake shoe having a contour complemental to an arcuate portion of the outer periphery of the tire, means mounting the brake shoe for movement to and from engagement with the outer periphery of the tire, to draw, when actuated, the brake shoe against the outer periphery of the tire, and means for moving the brake shoe away from the tire upon the release of the pressure to the hydraulic cylinder.

For a better understanding of the invention reference should be had to the accompanying drawings wherein.

Figure 2:
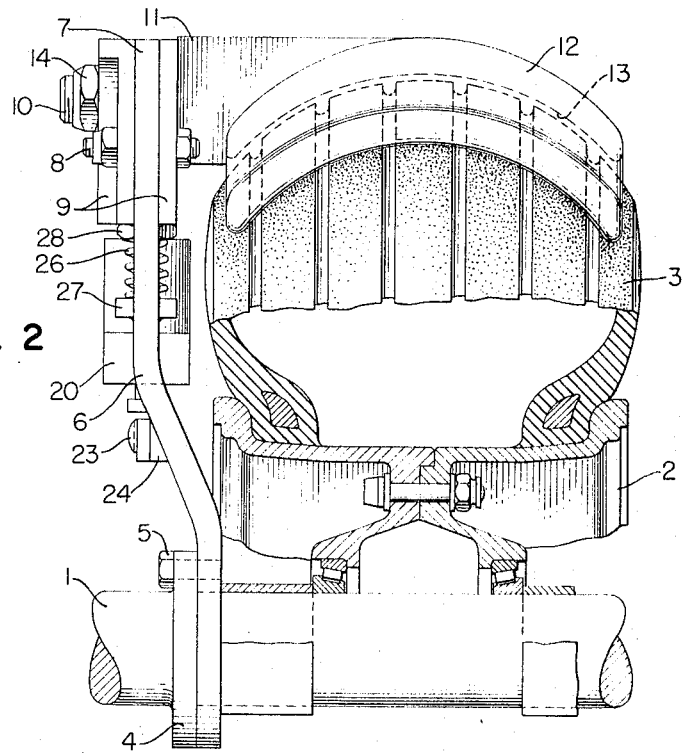
FIGURE 2 is an end elevation, partly in section, of the brake of FIGURE 1, portions of the wheel and tire being shown.

In the drawings, the numeral 1 indicates a fixed axle upon which is rotatably mounted a wheel or hub 2 which removably mounts a pneumatic tire 3. It will be noted that the brake combination of the invention is particularly adapted to use with pneumatic tires having relatively small internal bead diameters, for example, 6 inches in the embodiment of the invention illustrated. Thus, the wheel 2 really becomes only a hub. It will likewise be recognized that if the braking action is applied to the hub at the relatively small diameter thereof the braking forces must be much greater than is the case when the braking forces are applied out at the periphery of the tire where the torque radius is much greater.

Secured to a torque flange 4 on the axle 1 by means of cap screws or bolts 5 is a torque arm 6 which extends out substantially on a radius of the tire 3, but with the torque arm 6 being provided with a substantially vertically directed upper portion 7 which is at an oblique angle with the lower portion of the torque arm.

Pivotally secured near the upper end 7 of the torque arm 6 by means of a pivot bolt 8 is a pair of links 9 forming the legs of a clevis which straddles the upper portion 7 of the torque arm. The ends of the links 9 remote from the pivot bolt 8 may be welded to a spacer 15, and with the ends of the links and spacer rotatably receiving a stud 10 extending laterally from a boss 11 forming an integral part of a drag block 12. The block 12 has an inner surface 13 contoured laterally to the cross sectional shape of the outer periphery of the tire 3 and contoured longitudinally to the circumferential shape of the outer periphery of the tire 3. The drag block 12 in one operative embodiment of the invention was made from 24 ST aluminum. The outer end of the stud 10 is externally threaded and receives a nut 14 for securing the drag block 12 pivotally to the links 9.

Figure 3:
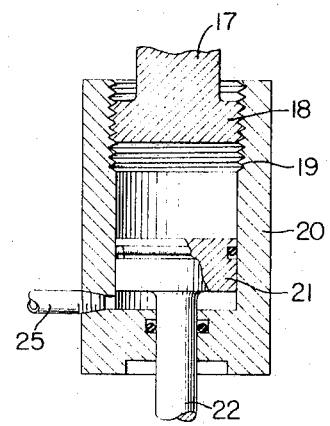
FIGURE 3 is a cross sectional view taken longitudinally through the hydraulic pressure cylinder incorporated in the brake.

In order to move the drag block 12 towards the outer periphery of the tire 3, the links 9 have a downwardly extending ear 15a on the spacer 15 welded between the links which ear is pivotally connected by a bolt 16 to the bifurcated upper end of a post 17 having an integral lower flange 18 which is externally threaded and which is adjustably positioned in the threaded bore 19 of one end of the hydraulic pressure cylinder 20, as best seen in FIGURE 3.

The hydraulic pressure cylinder 20 slidably receives a piston 21 having a piston rod 22 which is pivotally connected by bolt 23 to a bracket 24 welded to the torque arm 6.

Pressure applied by way of conduit 25 to the cylinder 20 accordingly effects movement of the cantilever mounted drag block 12 against the outer periphery of the tire 3 with links 9 pivoting about bolt 8 on the portions 7 of the torque arm 6.

Return movement of the drag block 12 to an inoperative or clearance position with the outer periphery of the tire 3, i.e. to the position shown in FIGURE 2, is effected by the provision of a compression spring 26 having its lower end mounted upon a bracket 27 welded to the torque arm 6, and with the upper end of the compression spring 26 engaging with a nut 28 adjustably mounted upon a threaded rod 29. The threaded rod 29 has its upper end extending up between the links 9 and pivotally secured by a bolt 30 to and between the links 9.

The limit of the outward movement of the drag block 12 to "brake-off" position is effected by removing the bolt 16 and rotating the post 17 in relation to the hydraulic cylinder 20 and then repositioning the bolt 16 in the lug 15. The adjustment of the nut 28 controls the pressure of return action of the spring 26.

Figure 1:
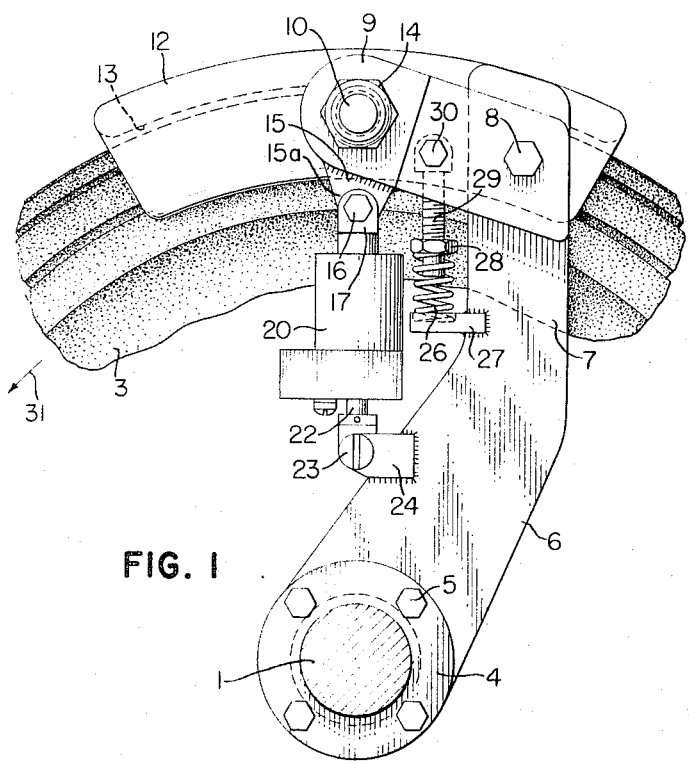
FIGURE 1 is a side elevation, partly in section, of the brake combination of the invention with all of the wheel and most of the tire being broken away.

The brake of the present invention preferably utilizes a self-energizing action, and this is achieved by mounting the brake so that the rotation of the tire is in the direction of the arrow 31 when looking at FIGURE 1. By positioning the pivot bolt 8 at a less radius than the engaging surfaces between the outer periphery of the tire and the inner surface of the drag block 12, the application of the drag block against the surface of the wheel causes the drag block to be pulled more tightly against the surface of the tire as the links 9 tend to swing downwardly about pivot bolt 8. This self-energizing action allows a much smaller diameter hydraulic cylinder 20 to be utilized than would be the case if no self-energizing action was achieved. And yet the self-energizing action is not so severe that any chattering or binding results between the drag block 12 and the surface of the tire.

The braking action is applied at a maximum diameter of the rotating pneumatic tire. The brake adapts itself to use with tires having relatively small bead diameters, and the objects of the invention as to lightness, low cost, and high efficiency are achieved.

Although in accordance with the patent statutes, only one best known embodiment of the invention has been illustrated and described in detail, it is to be particularly understood that the invention is not limited thereto or thereby, but that the inventive scope is defined in the appended claims.

What is claimed is:

1. In combination, a fixed axle, a pneumatic tire having a relatively small bead diameter, hub means rotatably mounting the tire on the axle, a torque arm fixed to the axle and extending substantially radially of the side of the tire, a brake shoe having a contour complemental to an arcuate portion of the outer periphery of the tire, link means pivotally secured at one end of the torque arm but at a radius less than the tire periphery, pivot means secured in cantilever fashion to the brake shoe and to the other end of the link means, a hydraulic pressure cylinder pivotally connected to the torque arm and to the said other end of the link means to draw, when actuated, the brake shoe against the outer periphery of the tire, and adjustable pressure spring means positioned between the torque arm and the link means for moving the brake shoe away from the tire upon the release of the pressure to the hydraulic cylinder.

2. In combination, a fixed axle, a pneumatic tire having a relatively small bead diameter, hub means rotatably mounting the tire on the axle, a torque arm fixed to the axle and extending substantially radially of the side of the tire, a brake shoe having a contour complemental to an arcuate portion of the outer periphery of the tire, link means pivotally secured at one end of the torque arm but at a radius only slightly less than the tire periphery so as to achieve a smooth self-energizing action upon brake actuation, pivot means secured in cantilever fashion to the brake shoe and to the other end of the link means, a hydraulic pressure cylinder pivotally connected to the torque arm and to the said other end of the link means to draw, when actuated, the brake shoe against the outer periphery of the tire, and means for moving the brake shoe away from the tire upon the release of the pressure to the hydraulic cylinder.

3. In combination, a fixed axle, a pneumatic tire having a relatively small bead diameter, hub means rotatably mounting the tire on the axle, a torque arm fixed to the axle and extending substantially radially of the side of the tire, a brake shoe having a contour complemental to an arcuate portion of the outer periphery of the tire, means pivotally mounting the brake shoe to the torque arm for movement to and from engagement with the outer periphery of the tire where the point of pivotal mounting with respect to the brake shoe is upstream of the normal direction of rotation of the tire, and slightly less than the tire periphery, a hydraulic pressure cylinder to draw, when actuated, the brake shoe against the outer periphery of the tire, and means for moving the brake shoe away from the tire upon the release of the pressure to the hydraulic cylinder.

4. The combination defined in claim 1 wherein there are two link means forming a clevis surrounding the torque arm and pivotally secured thereto.

References Cited by the Examiner

UNITED STATES PATENTS

| | | | |
|---|---|---|---|
| 1,136,851 | 4/1915 | Underhill | 188—29 X |
| 2,738,034 | 3/1956 | Levine | 188—29 |
| 3,098,545 | 7/1963 | Murphy | 188—152 X |
| 3,250,347 | 5/1966 | Holloway | 188—29 |

DUANE A. REGER, *Primary Examiner.*